| United States Patent [19]
Mackenzie | [11] 3,889,090
[45] June 10, 1975 |

[54] INDUCTION HEAT COOKING APPARATUS

[75] Inventor: Raymond W. Mackenzie, Pittsburgh, Pa.

[73] Assignee: Westinghouse Electric Corporation, Pittsburgh, Pa.

[22] Filed: Nov. 15, 1973

[21] Appl. No.: 416,327

Related U.S. Application Data

[63] Continuation of Ser. No. 370,253, June 15, 1973, abandoned, which is a continuation of Ser. No. 243,713, April 13, 1972, abandoned.

[52] U.S. Cl. ............ 219/10.49; 219/10.77; 321/18; 321/45 S; 331/109; 331/117
[51] Int. Cl. .............................................. H05b 5/04
[58] Field of Search ........... 219/10.49, 10.77, 10.79, 219/10.75; 321/4, 18, 43, 44, 45, 45 S; 331/117, 109, 183; 318/332; 307/240, 272

[56] References Cited
UNITED STATES PATENTS

| 3,256,417 | 6/1966 | Merrett ............................ 219/10.79 |
| 3,448,367 | 6/1969 | Corey ........................ 219/10.77 UX |
| 3,454,862 | 7/1969 | Kurlmube ............................ 321/18 |
| 3,504,269 | 3/1970 | Hullahan .............................. 321/18 |
| 3,535,612 | 10/1970 | Judd .................................. 321/45 S |
| 3,559,029 | 1/1971 | Yarema ................................. 321/43 |
| 3,562,621 | 2/1971 | Schaefer .......................... 321/18 X |
| 3,582,754 | 6/1971 | Itoffmann ............................ 321/18 |
| 3,584,282 | 6/1971 | Reeves ................................ 318/332 |
| 3,596,165 | 7/1971 | Andrews .............................. 321/18 |
| 3,684,853 | 8/1972 | Welch ............................. 219/10.49 |
| 3,710,062 | 1/1973 | Peters ............................. 219/10.49 |

*Primary Examiner*—Bruce A. Reynolds
*Attorney, Agent, or Firm*—C. M. Lorin

[57] ABSTRACT

There is disclosed cooking apparatus for heating a cooking utensil by magnetic induction from the work coil in a series resonant circuit driven by an oscillator operating at and tracking with the resonant frequency of the series resonant circuit, the apparatus being provided with structural, operating, and safety features, including (*a*) protection against high Q loads, (*b*) closed loop coil current regulation, (*c*) a mininum dummy load which dissipates less power with low Q load on the oscillator than with high Q load, (*d*) unique oscillator start circuit independent supply source, (*e*) Q-responsive feedback in control loop, and (*f*) line switch coupled to control reference selector.

7 Claims, 3 Drawing Figures

PATENTED JUN 10 1975

SHEET 2

3,889,090

INDUCTION HEAT COOKING APPARATUS

This is a continuation of application Ser. No. 370,253 filed June 15, 1973 which is a continuation of application Ser. No. 243,713, filed Apr. 13, 1972 both now abandoned, and assigned to the same assignee as this invention.

RELATED APPLICATIONS

Portions of the system described herein are also described and claimed in two other U.S. patent applications filed concurrently herewith, Ser. No. 243,714, abandoned, by Theodore M. Heinrich, entitled INDUCTION HEAT COOKING APPARATUS and Ser. No. 243,715 by Raymond W. MacKenzie and Theodore M. Heinrich, entitled INDUCTION HEAT COOKING APPARATUS, both applications assigned to the assignee herein.

BACKGROUND OF THE INVENTION

The application of the principle of induction heating to food preparation within the context of practical appliances especially for use in the home presents a number of considerations and problems such as reasonable size (compactness), convenience of control and maintenance, reliability, efficiency, radiation interference problems, protection of equipment, etc.

SUMMARY OF THE INVENTION

The present invention is directed to cooking apparatus employing induction heating for heating cooking utensils, which apparatus includes structural, operating, and safety features, including those mentioned in the Abstract herein making it especially adapted for but not confined to domestic cooking appliances such as ranges. Each of such features is important in its own light with respect to the effect on and cooperation with the oscillator, and additionally collectively important with the oscillator in providing a highly improved and desirable induction heating arrangement for heating cooking utensils.

In accordance with one embodiment of the invention a series resonant circuit including the induction work coil and capacitors is driven by an oscillator with semiconductor switching elements driven by current derived from the oscillating load current for alternately connecting DC supply lines to said load circuit in alternating polarity at the resonant frequency of the load circuit.

The DC input voltage is controlled in response to a selectable control reference and load current responsive and Q-responsive feedback derived from the load circuit.

The work coil is resonated with a capacitor and the coil-capacitor combination is always excited at resonance irrespective of the characteristics of the cooking utensil load. By driving the coil at the resonance, the volt-ampere rating of the power semiconductors is minimized. Since the work coil is driven at resonance, the power semiconductors, which produce the high frequency excitation switch ON and OFF when power current through the power semiconductors is practically zero, and therefore the switching losses are negligible. Radio frequency interference is reduced. The system is capable "infinitely" controlling the cooking power. The system can operate without damage with high Q loading such as occur when copper or aluminum cook pots are placed over the work coil or in the absence of any utensil. A dummy load prevents the control circuit from decreasing the DC supply voltage to such a low level as would stall the oscillator. Response to Q of resonant circuit reduces coil current rather than merely holding constant to reduce the magnetic field strength to reduce radiation interference problems. Independent start circuit supply facilitates restart even at low D.C. supply voltage. Line switch ganged with power reference control whereby switch is required to break only relatively low currents.

DESCRIPTION OF THE PREFERRED EMBODIMENT

Figure 1:
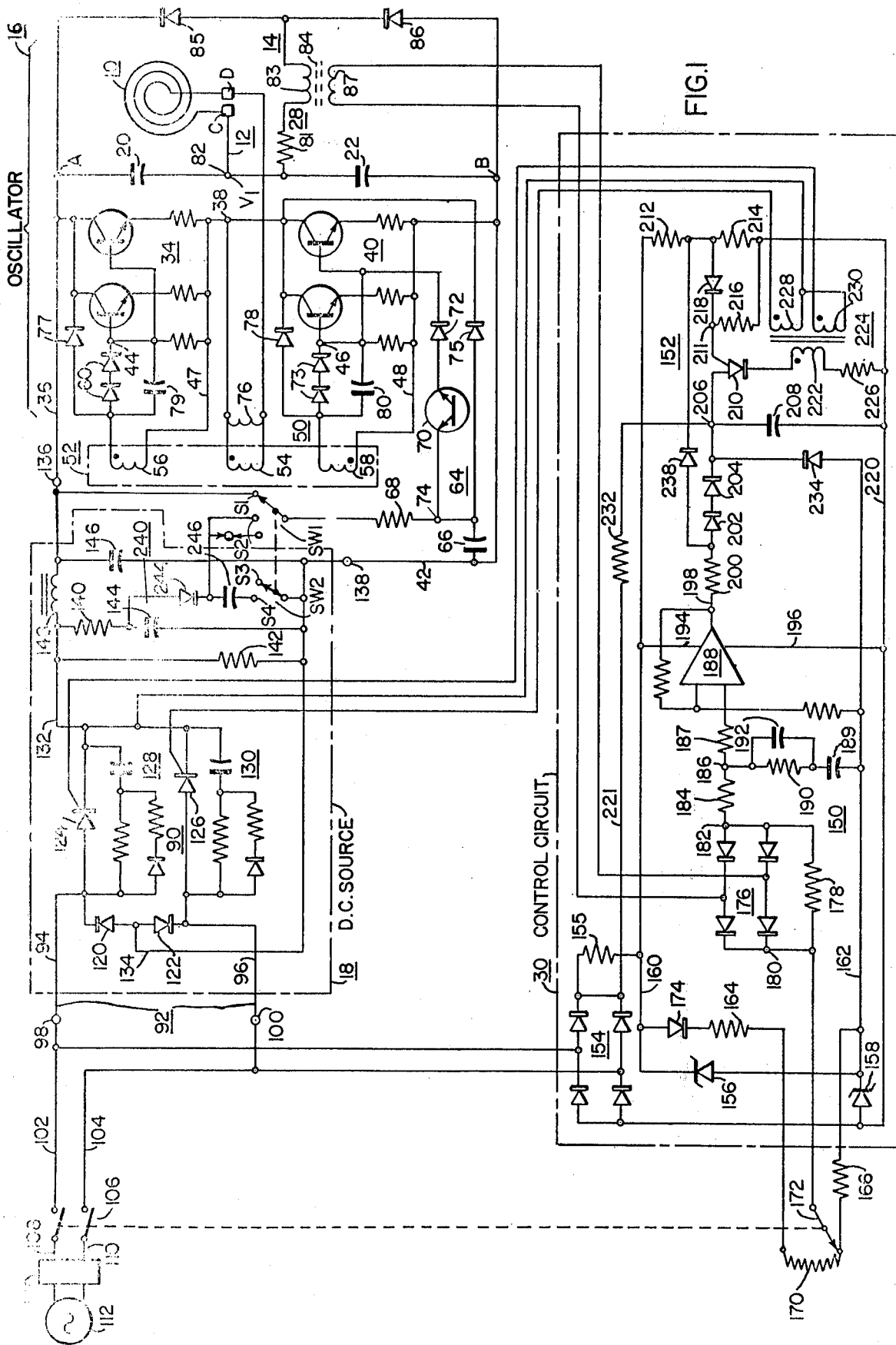
FIG. 1 is a diagram of an induction heat cooking system illustrating a preferred embodiment of the invention.

The induction heating system of FIG. 1 includes an induction work coil 10 that is a part of a series resonant circuit 12 in the load circuit 14 of a high frequency (for example, 27 KHz) oscillator 16 energized from a controllable DC power source 18. In addition to the work coil 10, the series resonant circuit 12 includes capacitors 20 and 22 with which the work coil resonates.

The work coil 10 is part of a cooking range 17 which also includes a suitably supported cooking top 24 (FIG. 2) made of suitable nonmagnetic material for example a glass-ceramic, and on which an electrically conductive and preferably magnetic utensil 26 rests for heating thereof by electro-magnetic induction from the work coil 10, which is mounted under the cooking top 24. Work coil 10 is shown as a multi-turn (for example 30 turns) spirally wound pancake coil, which may be mounted on the underside of the cooking top 24 or it may be independently supported in fixed relation to the cooking top whereby utensils placed on the cooking top over the work coil will be closely electromagnetically coupled to the coil for induction heating thereby.

Figure 2:
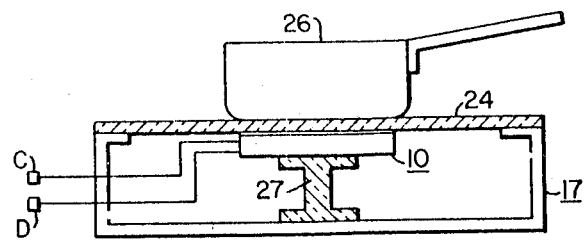
FIG. 2 shows the general physical placement of the elements of the cooking range.

By way of example, the glass-ceramic cooking top 24 may be approximately 0.2 in. thick. In FIG. 2, work coil 10 is shown supported by a ceramic bracket 27 secured to the frame of the range 17.

Load circuit 14 also includes a dummy load circuit 28 to insure that the oscillator will have at least a predetermined minimum load on it in case a high Q load for example a copper utensil is inductively coupled to the work coil. The D.C. output voltage of the power supply 18 and consequently the power output of the oscillator 16 is controlled by a control circuit 30 in response to reference and feedback signals. The feedback signal is derived from the oscillator load circuit 14.

Oscillator 16 is shown as a bridge-type oscillator. Although the specific bridge-type shown is a half-bridge oscillator, a full-bridge oscillator may also be employed and the same general principles of operation will apply. More specifically, in accordance with the invention oscillator 16 is shown as a series resonant, current driven, bridge-type oscillator. The oscillator includes a first switching block 34 having a power path connected between a positive D.C. bus 36 and one end 38 of the load circuit 14. A second switching block 40 has a power path connected between the terminal 38 and the negative D.C. bus 42.

The respective switch blocks 34 and 40 are provided with control terminals 44 and 46 through which drive signals control the switching function of the respective blocks. Each of the switching blocks includes one or more semiconductor switching devices preferably transistors as shown. The two parallel connected transistors shown in each switching block are symbolic of one or any desired plurality of transistors depending on the power requirements. By way of example, the transistors are shown as NPN type with the power path therethrough between the collector and emitter electrodes. The power paths of the transistors in each switching block are collectively the power path for the block.

The base or control electrodes of the transistors of block 34 are connected to the block control terminal 44, while the base electrodes of the transistors of block 40 are connected to the block control terminal 46. The collectors of the transistors of switch block 34 are connected to the positive D.C. bus 36, while their emitters are connected through respective emitter resistors to a conductor 47 and the terminal 38. The collectors of the transistors of switch block 40 are connected to terminal 38, while their emitters are connected through respective emitter resistors to a line 48 and the negative D.C. bus 42.

A switch drive circuit 50 for driving switch blocks 34 and 40 includes a current transformer 52 having a primary winding 54 coupled to secondary windings 56 and 58. Polarity relations of the transformer windings are indicated by the self-explanatory-dot convention. Primary winding 54 is connected in series with the load circuit 14, whereby it is excited by the oscillating load current. Thus the outputs of secondaries 56 and 58 (180° apart) are currents derived from the oscillator load circuit. Secondary winding 56 is connected to the control terminal 44 of switch block 34 to provide drive for that switch block. More specifically, the upper end of winding 56 is connected through diodes 60 to the base electrodes of the transistors in switch block 34, while the lower end of winding 56 is connected to the line 47 at the lower ends of the emitter resistors in switch block 34. Thus, winding 56 is connected across the control input circuit of the switch block 34. In like manner, secondary winding 58 is connected across the control input circuit of switch block 40.

Oscillator 16 is provided with a starter circuit 64 connected across the control input circuit of switch block 40. It includes a capacitor 66 in series with a charging resistor 68 connected across the D.C. buses 36 and 42 whereby the capacitor is charged through the resistor. A voltage breakover device 70, for example a diac or a Shockley diode, is connected in series with a diode 72 between the control terminal 46 of switch block 40 and the junction 74 between capacitor 66 and resistor 68. A diode 75 is connected from the junction 74 to the upper end of the power path of switch block 40, that is to the collector electrodes of the transistors in that switch block. The capacitor-resistor-Shockley diode combination form a relaxation oscillator for initially triggering the oscillator 16.

Oscillator 16 operates from "standstill" as follows: At standstill both switch blocks 34 and 40 are OFF. When power is initially applied to the D.C. buses 36 and 42, capacitors 20 and 22 assume a charge, and capacitor 66 charges through resistor 68 until the breakdown voltage of Shockley diode 70 is reached and the diode breaks over. This applies a pulse to the control terminal 46 of the switch block 40 thereby turning ON the transistors of that switch block. Load current starts and it is drawn through both capacitors 20 and 22, passing through work coil 10, primary 54 and the ON transistors of switch block 40. Due to the directions of transformer windings 54, 56 and 58, the 180° apart induced voltages in windings 56 and 58 apply voltage in the turn-ON direction to the control input circuit of switch block 40 and in the turn-OFF direction to the control input circuit of switch block 34. Thus, during this half cycle of operation, regenerative feedback is applied to the control line 46 of switch block 40 while the base drive to transistors of switch block 34 is effectively zero.

At the end of the half cycle of the resonant frequency, the load current in the resonant circuit reverses (due to resonance ringing). At reversal the base current to the transistors of switch block 40 has reached the turn-OFF level, and the outputs of transformer windings 56 and 58 are reversed to apply turn-OFF voltage to the control input line 46 of switch block 40 and turn-ON voltage through the control input line 44 of switch block 34. During this half cycle, winding 56 applies regenerative feedback to reenforce the ON state of the switch block 34, while at the same time the switch block 40 is without base drive. At the end of this half cycle, the load current and the conductivity states of respective switch blocks 34 and 40 again reverse and keep reversing as the oscillator 16 oscillates at the natural frequency of the series resonant circuit 12. Once the oscillator is running, diode 75 ensures that capacitor 66 is kept discharged below the breakdown level of Shockley diode 70.

In a series resonant circuit, current is maximum at resonance and therefore with current feedback as supplied by transformer 52, the feedback will be maximum at resonance. As a result, the oscillator 16 has a natural tendency to operate at the natural frequency of the series resonant load, i.e., track the natural frequency of the load, and produce a nearly sinusoidal coil current. Operation with a nearly sinusoidal coil current reduces radio frequency interference problems. Operation at resonance is desirable to minimize switching losses, and self-tracking of resonance is desirable since the work coil 10 inductance varies with differing loads, i.e., different cooking utensil size and material.

Although the oscillator 16 tends to operate at resonance, it would operate at some frequency below resonance if slow transistors are employed. The delay due to slow transistors can be compensated for by the addition of a shunt inductance 76 across the transformer primary 54, thereby advancing the phase of the base current, or more simply by the use of a transformer 52 having the proper inductance. The latter implementation is preferably in the form of an air core transformer 52 having the required inductance parameter compatible with the speed of the transistors employed. On the other hand, if the very fast transistors are employed, it may be desirable to employ an iron core structure for transformer 52. Transistor switching speeds may be improved by operation slightly above saturation voltage. This is accomplished by diodes 77 and 78 which are referenced to a potential above the base voltages by the diodes 60 and 73. Thus, when the collector voltage approaches the base voltage too closely, the drive current is diverted from the bases to the collectors of the transistors to maintain the reverse biasing of the base-collector junctions. Capacitors 79 and 80 provide paths for reverse base currents at the end of each half cycle. The separate emitter resistors shown are provided to insure current sharing by the paralleled transistors. The effectiveness of these current equalizing resistors is also improved by operation of the transistors above saturation voltage.

The principle of eddy current heating is used to transfer energy from the work coil 10 to the utensil 26. More specifically, the high frequency alternations of the electromagnetic field setup by the work coil 10 induce eddy currents into the bottom of the utensil 26 and thereby heat the same. Power to the utensil 26 is controlled by varying the work coil 10 current. Since the oscillator utensil combination resembles a resistive load to the D.C., control of the coil current may be effected by varying the D.C. supply voltage to the oscillator 16. Control circuit 30, sensing the load current as hereinafter described, maintains desired load current by adjusting the D.C. power supply voltage to compensate for fluctuations in the supply voltage.

The "resistance" or load presented to the work coil 10 by the utensil 26, is relatively high under normal operation, for example with a utensil made of iron. Circuit quality factor Q is therefore low. Circuit Q becomes high when the utensil is removed or a utensil of low-resistance metal such as aluminum or copper is substituted. With a high Q, the effective impedance of the tuned circuit drops. To prevent this low impedance from damaging the power transistors, the control circuit 30, senses this as hereinafter described and reduces the D.C. supply voltage to oscillator 16.

While the path of most of the work coil or load current is through capacitors 20 and 22, a portion in quantity and time, passes through the dummy load circuit 28. This circuit includes a dummy load 81 in the form of a resistor connected between the midpoint 82 of the series resonant circuit 12 and the positive and negative D.C. buses 36 and 42 through the primary winding 83 of a current transformer 84 and diodes 85 and 86.

During the alternations of the oscillator 16, when the voltage $V_1$ at the junction 82 is more positive than the positive D.C. bus 36, load current will flow from the series resonant circuit through the dummy load 81, the primary 83, diode 85, and the ON power transistors, thus dissipating energy. On the other half cycle when the voltage $V_1$ is more negative than the negative D.C. line 42, load current will flow from the tuned circuit through the ON power transistors, diode 86, primary 83, dummy load 81, to the junction 82. The dummy load 81 draws current only for that portion of the cycle that the voltage at junction 82 in its alternations exceeds the voltage of the positive and negative buses 36 and 42. For any given loading of the load circuit, the current through the primary 83 is proportional to the total load current, i.e, the current through the series resonant circuit. Thus, for any given loading, the secondary 87 of the current transformer provides a signal which is proportional to total load current. The output of transformer 84 is supplied as a feedback signal to the control circuit 30.

Voltage $V_1$ at junction 82 is a function of the Q of the series resonant circuit 12, and the output of transformer 84 is proportional to the Q of the resonant circuit, or the voltage excursions of $V_1$ above and below the supply voltage. Since the latter is an inverse function of loading of the work coil, the dummy load draws more power when the utensil is removed than when it is in place. This provides extra forcing to the control circuit 30 in case of high Q load such as when utensil 26 is removed. The action in this respect is regenerative thus speeding response to rise in Q. As is well known the quality factor Q of a series resonant circuit is $q = X_c/R$  $X_L/R$, where $X_c$ is capacitive reactance and $X_L$ is inductive reactance, and R is resistance.

The variable voltage D.C. power source 18 includes a rectifier 90 and an AC input circuit 92 for energizing the rectifier. The input circuit 92 comprises a pair of lines 94 and 96 connected to AC input terminals 98 and 100 which are connected to a pair of lines 102 and 104 that are connectable through a double pole switch 106 to AC supply lines 108 and 110 which in turn are connected to an AC source 112. There may be inserted at 114 in the AC lines 108 and 110 various protective devices for limiting high voltage spikes from the line to equipment and for attenuating interference from the line to equipment and vice versa. Such devices may include surge limiting devices and a low pass filter.

By way of example, the D.C. power supply 18 is shown as being phase-controlled with reference to AC supplied to the AC input circuit 92. To this end, rectifier 90 is a bridge type rectifier including rectifier elements 120 and 122 and controlled rectifiers 124 and 126 (for example SCR's) shunted by protective suppression networks 128 and 130. The input of the bridge is connected to lines 94 and 96, while the output of the bridge appears on lines 132 and 134. The D.C. output terminals of the source 18 are indicated at 136 and 138, and are respectively connected to the D.C. output lines 132 and 134 of the rectifier 90 with suitable bleeder and filter elements interposed therebetween. These elements may include resistors 140 and 142, capacitors 144 and 146 and a choke 148. Terminals 136 and 138 are connected to the positive D.C. bus 36 and the negative D.C. bus 42 respectively.

Control circuit 30 generally includes an error generator 150 and a phase-control firing or gating circuit 152 for firing the controlled rectifiers 124 and 126 in accordance with the error signal output of the error generator. The error generator 150 develops an error signal proportional to the difference between desired work coil current and actual work coil current in respose to signals representing these items supplied to the error generator in a manner hereinafter described. Additionally the error generator responds to the quality factor Q of the load circuit as hereinafter described.

A fullwave bridge rectifier 154 energized from the AC lines 102 and 104 provides D.C. voltage for the control circuit 30. A resistor 155 lowers the peak voltage seen by the control circuit and limits control circuit current. Zener diodes 156 and 158 connected in a circuit across the output of rectifier 154 set up two different voltage level rails 160 and 162, for example at 20 volt and 10 volt levels usiing 10 volt Zeners. These two rails fall to 0 volts every half cycle of the 60Hz line 102–104. This synchronizes the control circuit with the 60 Hz line. Resistors 164 and 166, and a control potentiometer 170 form a voltage divider that provides a variable voltage at the contact arm 172 of the potentiometer 170 for furnishing a selectable reference signal proportional to and representing desired work coil current and power into the cooking utensil 26. As will be seen, power into the cooking utensil is determined by the setting of the control potentiometer 170. A diode 174 comes into play, when the 20v rail 160 starts to fall; it prevents capacitance within the circuit from feeding into the 20v rail 160 which would upset synchronization with the AC line. Line switch 106 and the control potentiometer arm 172 are ganged so that the line switch is required to make and break only relatively low value of current.

Feedback from oscillator 16 representing load current and also responsive to changes of Q of the load circuit is supplied to the error generator 150 in the control circuit 30 by feeding the output of transformer 84 into the input of a rectifier bridge 176 that forms part of the error generator 150. A resistor 178 is connected across the D.C. output terminals 180 and 182 of bridge 176. Potentiometer arm 172 is connected to terminal 180 to supply to the error generator 150 a reference signal representing desired work coil current or load circuit power. A resistor 184 is connected between terminal 182 and a junction 186, which is connected through a resistor 187 to the input of a voltage amplifier 188. A capacitor 189 and a resistor 190 are connected in series between junction 186 and the 10 volt rail 162. Resistor 190 is shunted by a capacitor 192.

Rectifier 176 and resistor 178 provide a feedback voltage which is algebraically summed with the potentiometer arm 172 reference voltage, thus to provide a voltage at junction 186 proportional to their difference or error therebetween. Thus, the voltage at junction 186 is proportional to the difference between desired power and the actual power in the load circuit 14.

In the example shown the feedback voltage is subtracted from the reference voltage thus to lower the voltage to which the junction 186 charges up to. The greater the feedback voltage, the lower will be the voltage at junction 186, and vice versa.

The firing circuit 152 and power supply 18 respond to and are controlled in accordance with the error signal at junction 186. Elements 814, 187, 189, 190 and 192 form a network having a lag-lead-lag transfer characteristic and which provides loop stabilization and a soft start function.

Power is supplied to the amplifier 188 over lines 194 and 196. The output of amplifier 188 on a line 198 is fed to the control input of firing circuit 152, which employs the well known Ramp and Pedestal phase control technique. More specifically, the amplifier output line is connected through a current limiting resistor 200 and a pair of diodes 202 and 204 to a junction 206 that is connected to one end of a capacitor 208 and to the anode of a PUT (Programmable unijunction transistor) 210. The gate of the PUT is connected to a junction 211 to tie it to a reference voltage source formed by a network including resistors 212, 214 and 216 and a diode 218, connected between positive rail 160 and the negative line 220. Junction 211 is between diode 218 and resistor 216.

The primary winding 222 of a pulse transformer 224 and a series resistor 226 are connected between the cathode of the PUT and the negative line 220. Secondary windings 228 and 230 of the pulse transformer are respectively connected to the gate circuits of SCR's 126 and 124.

Capacitor 208 charges up to the amplifier 188 output voltage (less two diode drops) in a relatively short time compared to the period of the 60Hz line half cycle. Resistor 200 limits the current and thereby slows down the charging time of capacitor 208, thus to slow down the overall system response and thereby gain added closed-loop stability. The voltage output of the amplifier less the two diode drops becomes the voltage on capacitor 208. This voltage level is called the pedestal voltage.

The positive output line 221 of rectifier 154 is connected through a resistor 232 to the junction 206 and thereby to capacitor 208. During a half cycle, a cosinusoidal voltage increase above the pedestal voltage appears on capacitor 208 since the charging current varies as the positive half of a sine wave. This amount of voltage increase is referred to as the ramp voltage. As hereinbefore described, capacitor 208 is tied to the anode of the PUT 210. When the voltage at the PUT anode exceeds the gate voltage by a certain small amount, a positive pulse occurs in the cathode path and hence through the pulse transformer 224; this firing pulse appears across the gate and the cathode of both SCR's in the rectifier bridge 90. Only one SCR is forward biased, though, and that SCR then fires. On the next half cycle, the ramp and pedestal and pulse generation are repeated to fire the other SCR in rectifier 90, it being forward biased at this time.

The anode voltage of the PUT 210 is determined by the sum of the pedestal voltage and the ramp voltage. When this sum exceeds the PUT gate voltage that is determined by resistors 212 and 214 (for example, nominally 16 volts), the firing pulse occurs. Therefore it can be seen that, by increasing the pedestal voltage with the control potentiometer 172, the pedestal and ramp voltage sum will meet the gate voltage of the PUT 210 earlier in the half cycle and more voltage and line current will be supplied by D.C. source 18 to oscillator 16, resulting in more power output. The same is true if the feedback is reduced. Decreasing the pedestal voltage by means of the reference potentiometer or by increase of feedback causes the needed pedestal and ramp voltage sum to occur later in the 60Hz line half cycle and therefore lowers the power output of oscillator 16.

A diode 234 insures that the voltage on capacitor 208 never falls to more than a diode drop below a predetermined level, for example 10 volts, prior to firing. This guarantees that the PUT "fires" every half cycle and thus closed-loop stability is enhanced. Diode 204 prevents ramp current from feeding into the circuit beyond capacitor 208. The diode array of 202, 204, 218 and 238, and the anode-to-cathode voltage drop of the PUT 210 act to prevent closed-loop instability when the line voltage falls below its specified minimum value. Along with resistor 216, diode 218 also acts as a temperature compensating network for the PUT. From the description herein, it should be apparent that the regulating loop including the feedback representing load circuit current and power will operate to regulate the actual load circuit power to the desired (demanded) value of power as represented by the reference signal selected by the position of the potentiometer arm 172. If with given utensil loading, actual power increases over the demanded value, the feedback signal will increase to reduce the D.C. supply voltage out of source 18. The converse is true if the actual power drops below demanded power. The system reaches equilibrium when actual power equals the demanded value of power. Closed loop operation protects the power transistors from excessively high current caused by removal of the load (utensil). Complete removal of the load may cause the supply voltage to drop to a value too low to sustain oscillation. When the oscillator restarts, the loop has allowed the supply voltage to climb to a value which causes the initial transistor current to be excessive, and the cycle would repeat itself except for the dummy load 81 and diodes 85 and 86. As heretofore explained the dummy load draws more power when the utensil is removed than when it is in place. In other words the dummy load dissipates more power at high Q.

Figure 3:
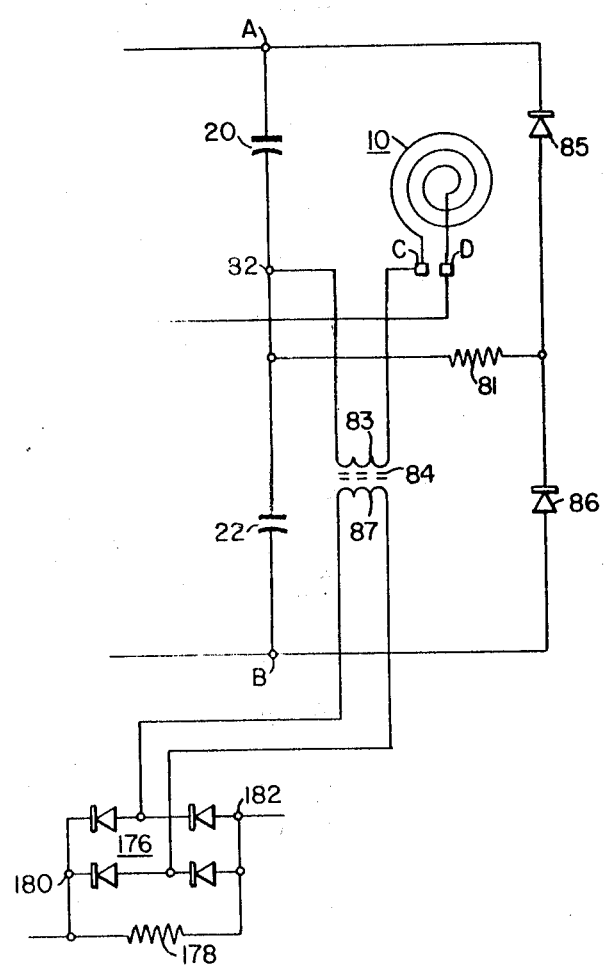
FIG. 3 is a diagram showing an alternative connection for the feedback transformer.

The feedback also responds to the Q of the resonant circuit such that if the loading on the work coil is so changed as to change the Q of the circuit, the feedback will increase when Q is increased, and decrese when Q is decreased. These effects are regenerative, tending to speed up response. Alternatively, the feedback responsive to current and power may be obtained by inserting the primary 83 of current transformer 84 between the work coil 10 and junction 82 as shown in FIG. 3. However, in the system with the connection as in FIG. 3, the feedback will be responsive to and represent current and power only. It will not be responsive to the Q of the circuit. In the system using the alternative connection of FIG. 3, the dummy load provides the same function as hereinbefore described. In case of a high Q load the operation of the dummy load prevents the control circuit 30 from decreasing the D.C. supply voltage to such a low value as would stall the oscillator 16.

An advantage of the Q-responsive feedback is that it reduces coil current rather than merely hold it constant to reduce the magnetic field strength to reduce radiation interference problems.

Since the voltage $V_1$ at the midpoint 82 of the series resonant circuit is a function of the Q, of that circuit, Q-responsive feedback may also be supplied if desired by a voltage transformer connected across the dummy load 81.

A different supply circuit for the starter 64 is illustrated at 240, and may be connected to the starter by moving ganged switches SW1 and SW2 to close the circuits at contacts S2 and S4 and open the circuits at contacts S1 and S3. When connected into the circuit by switches SW1 and SW2, supply circuit 240 is connected across the output of bridge rectifier 90 and includes in series, resistor 140, a diode 244, and a capacitor 246. The junction between diode 244 and capacitor 246. The junction between diode 244 and capacitor 246 is connected to switch contact S2.

Capacitor 246 charges through diode 244 to provide an independent source of power for the start circuit 64, to facilitate restart of the oscillator 16 even if the D.C. supply to the oscillator 16 falls to a low value.

It should be understood that other types of error generating or summing circuits responsive to reference and feedback signals may be employed to generate the signal for controlling the firing circuit 152. The particular firing circuit is shown only as an example as other types of phasecontrol firing circuits referenced to the supply AC may be employed. It may be noted that pedestal and ramp type phasecontrol firing circuits are known in the art, an example being disclosed in U.S. Pat. No. 3,584,282.

Line switch 106 is shown ganged with the control potentiometer arm 172 so that the switch is required to make and break only relatively low values of current.

A practical example for the operating frequency of the oscillator 16 and work coil current is approximately 27 KHz, although other suitable frequencies may be chosen. To provide the desired frequency, circuit components, for example the elements of the series resonant circuit are chosen in accordance with know design techniques.

At the example frequency the most desirable material for the cooking utensil 26 is a high resistance magnetic metal such as iron or steel. Aluminum or copper unless very thin will not heat up sufficiently to warrant their use at the example frequency.

It should be understood that the herein described arrangements are simply illustrative of the principles of the invention, and that other embodiments and applications are within the spirit and scope of the invention.

I claim as my invention:

1. In apparatus for heating a cooking utensil by magnetic induction and operative with DC power supply lines, said apparatus comprising the combination of:
   induction coil means adapted to be coupled to cooking utensil;
   series resonant circuit means including coil means;
   DC power supply means including said DC power supply lines for supplying power to said induction coil means;
   switching means connected to said DC power supply lines for converting DC power to AC power, and for energizing said series resonant circuit means;
   means connected to said induction coil means and to said DC power supply lines for providing a signal representative of voltage excursions of said induction coil means under resonance condition of operation beyond the voltage level of said DC power supply lines;
   means for controlling the voltage level of said DC power supply lines in response to said signal, wherein said signal comprises a component that is a non-linear function of the Q of said induction coil means;
   said means for controlling being adapted to lower said DC voltage level in response to said signal when the Q of said induction coil means increases; and
   means responsive to the Q of said induction coil means and operative beyond a predetermined high value of said Q to modify said signal for providing continued operation of the apparatus.

2. The apparatus of claim 1 with the means responsive to the Q of said induction coil means including a dummy load, said dummy load dissipating less power for low Q values of said induction coil means.

3. The apparatus of claim 2 with said dummy load being connected to said means for providing a signal.

4. The apparatus of claim 3 with said means for providing a signal including a transformer having primary and secondary windings and first and second diodes each connected between a corresponding one of said DC power supply lines and one end of said primary winding, the polarity of each of said diodes being arranged to block conduction from the associated DC power supply line to said primary winding, and to be conductive in relation to said voltage excursions, said secondary winding being connected to said means for controlling; said dummy load consisting in a resistor inserted in series with said primary winding to dissipate power as a function of said Q.

5. In an induction heat cooking apparatus comprising a resonant circuit having a frequency in the ultrasonic range including a heating coil and capacitor means connected in series resonance with the inductance of said heating coil, a source of DC power for supplying energy to said heating coil, switching means consisting of first and second power transistor means connected to said DC source and transformer means responsive to said resonant circuit for feeding back current to drive said first and second power transistor means reciprocally in the switching mode at the frequency of resonance of said heating coil, said apparatus further comprising phase shifting means connected between the input of said transformer means and the output thereof for synchronizing the response of said first and second power transistor means to said frequency of resonance by introducing a phase advance between operation of said resonant circuit and driving of said first and second power transistor means to compensate for inherent slowness in response of said first and second power transistor means.

6. The apparatus of claim 5, with said transformer means including a primary winding connected in circuit with said capacitor means and said heating coil, secondary winding means operative with said primary winding and adapted to drive said first and second power transistor means alternately for each alternation of said heating coil in response to said resonant circuit, and wherein said phase shifting means includes an inductance shunted across said primary winding.

7. The apparatus of claim 5 with said transformer means including a primary winding connected in circuit with said capacitor means and said heating coil, secondary winding means operative with said primary winding and adapted to drive said first and second power transistor means alternately for each alternation of said heating coil in response to said resonant circuit, and wherein said phase shifting means includes an inductance provided by the inductive characteristics of said primary winding and said secondary winding means.

* * * * *